United States Patent
Volker et al.

(10) Patent No.: US 8,225,678 B2
(45) Date of Patent: Jul. 24, 2012

(54) FLUID FLOW METER USING THERMAL TRACERS

(75) Inventors: Arno Willem Frederik Volker, Delft (NL); Huibert Blokland, Noordeloos (NL); Johannes Fransiscus Maria Velthuis, Leiden (NL); Joost Conrad Lötters, Ruurlo (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 401 days.

(21) Appl. No.: 12/514,020

(22) PCT Filed: Nov. 9, 2007

(86) PCT No.: PCT/NL2007/050550
§ 371 (c)(1),
(2), (4) Date: Sep. 18, 2009

(87) PCT Pub. No.: WO2008/056984
PCT Pub. Date: May 15, 2008

(65) Prior Publication Data
US 2010/0000333 A1    Jan. 7, 2010

(30) Foreign Application Priority Data
Nov. 10, 2006   (EP) .................................... 06077001

(51) Int. Cl.
*G01F 1/708* (2006.01)
*G01F 1/66* (2006.01)
*G01F 1/00* (2006.01)

(52) U.S. Cl. ............. 73/861.95; 73/861.26; 702/48
(58) Field of Classification Search ............. None
See application file for complete search history.

(56) References Cited

U.S. PATENT DOCUMENTS

| | | | |
|---|---|---|---|
| 4,841,780 A | 6/1989 | Inada et al. | |
| 4,932,250 A * | 6/1990 | Assaf et al. | 73/204.24 |
| 6,386,050 B1 * | 5/2002 | Yin et al. | 73/861.95 |
| 7,270,015 B1 * | 9/2007 | Feller | 73/861.95 |
| 2005/0005710 A1 | 1/2005 | Sage, Jr. | |
| 2011/0087447 A1 * | 4/2011 | Volker et al. | 702/49 |

FOREIGN PATENT DOCUMENTS

DE   198 58 388 A1   6/2000

OTHER PUBLICATIONS

International Search Report Dated Jan. 18, 2008, International Application No. PCT/NL2007/050550.

* cited by examiner

*Primary Examiner* — Harshad Patel
(74) *Attorney, Agent, or Firm* — Leydig, Voit & Mayer, Ltd.

(57) ABSTRACT

A fluid flow meter is described that uses thermal tracers to measure flow speed. For fluid flowing through a conduit, the fluid is heated at a heating location in the conduit with a time-dependent heating strength. A speed of sound in fluid flowing in the conduit is measured at multiple sensing locations downstream from said heating location. The flow speed of the fluid is determined from a delay with which the time dependence is detected in the sound speeds measured at the sensing locations. A frequency of the variation of heating strength that is used to determine the flow speed is selected automatically based on the flow speed and/or other circumstances.

11 Claims, 2 Drawing Sheets

FLUID FLOW METER USING THERMAL TRACERS

FIELD OF THE INVENTION

The invention relates to a fluid flow meter and to a method of measuring fluid flow.

BACKGROUND

It is known to measure fluid flow using thermal time of flight. In a thermal time of flight measurement the fluid is heated locally. Subsequently, the temperature is measured at different positions to detect how fast a locally heated fluid element is transported by flow of the fluid. In the known measurement the fluid flows through a conduit and temperature sensors attached to the wall of the conduit, or inside the conduit, are used to measure temperature of fluid that is in contact with the sensors. This method of measuring has the disadvantage that the measurement result partly depends on the relation between conduit properties and fluid properties other than flow speed. With decreasing conduit size and flow speed these other dependences increasingly affect the accuracy of the measurement.

Another known fluid flow measuring technique is ultrasonic time of flight measurement. In this technique measurements are made of the time intervals needed to pass ultrasound a certain distance against the flow and along the flow respectively. Flow speed can be computed from the difference between the measured time intervals and the distance travelled by the sound. Due to limitations on time measurement this technique is only accurate for sufficiently high flow speed.

SUMMARY OF THE INVENTION

Among others, it is an object of the invention to provide for a fluid flow meter and a method of measuring fluid flow speed that has little or no dependence on fluid properties than flow speed and is suitable at least for low flow speeds.

According to one aspect a measurement of sound speed is performed and used to detect changes in local temperature of the fluid in a thermal time of flight measurement. The use of sound speed does not merely make it possible to measure flow, but it does so in a way that makes the flow measurement independent of effects of the wall that depend on fluid properties. Thus, a fluid flow meter is realized that is substantially independent of such properties of the fluid. Moreover, this makes it possible to perform temperature measurement much faster than with contact based temperature measurement, without a need for contact with the heated fluid.

In an embodiment the fluid is heated locally in the conduit at a location away from the wall of the conduit through which the fluid flows. This makes it possible to eliminate the effect of the walls on heating. A laser, focussed or at least convergent in said location may be used for example, or a microwave heating source, or a heater wire etc.

In an embodiment the time dependence of the sound speed that is used to measure flow speed is dynamically set to a frequency or limited to frequency range that is adapted to the flow speed and/or fluid properties. "Dynamical setting" means that the setting is performed dependent on the conditions determined at the time of measurement of the flow speed, which may comprise setting dependent on the actual flow speed at the time of measurement. Setting of the frequency or frequency range may be realized for example by adapting the frequency of the time dependence of heating strength to that frequency or limiting its frequency range. The selected frequency or frequency range is determined so that inaccuracy of the measurement due to heat diffusion is smaller than a predetermined value. In a further embodiment the frequency is set to depend quadratically on flow speed according to a predetermined (e.g. programmed) relation. In another embodiment the frequency is selected dependent on measurements.

BRIEF DESCRIPTION OF THE DRAWINGS

These and other aspects and advantageous aspects of the invention will become apparent from a description of exemplary embodiments, using the following figures

DETAILED DESCRIPTION OF THE DRAWINGS

Figure 1:
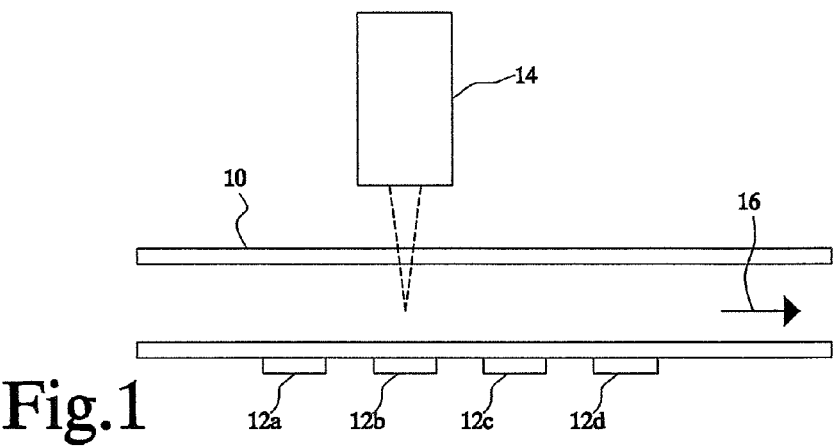
FIG. 1 shows a flow speed measurement arrangement

FIG. 1 shows a flow speed measurement arrangement comprising a conduit 10, a series of sensors 12a-d attached to the wall of conduit 10, and a laser assembly 14. Laser assembly 14 is focussed at a focus region within conduit 10 adjacent one of the sensors 12a-d at a second position in the series. The focus region lies apart from the wall of conduit 10, i.e. part of the space within the wall surrounds the focus region and is not part of it.

In operation, fluid flows through conduit 10 in a direction indicated by an arrow 16, past successive ones of sensors 12a-d and through the focus region where laser assembly 14 is focussed. In an embodiment the diameter of conduit is selected so that in a range of possible flow speeds laminar flow profile occurs. In this embodiment laser assembly 14 is preferably focussed at a point where maximum flow occurs in the profile, or at least at a point where the flow speed does not deviate from the maximum of the profile by more than a predetermined fraction of for example ten percent.

Laser assembly 14 is activated to generate laser generation with a time dependent intensity, such as an intensity pulse or sinusoidally varying intensity. The wavelength of the radiation is selected so that at least part of the radiation from the laser pulse will be absorbed by the fluid, with the result that the fluid is heated locally. As the fluid moves through conduit 10, different fluid portions that pass through the focus region are heated to a varying degree. The heated fluid portions moves through conduit 10 along sensors 12c-d as a result of the flow.

Figure 2:
FIG. 2 shows temperature as a function of position

FIG. 2 shows a theoretical temperature of the fluid as a function of position along a virtual line through conduit 10 along the direction of flow, when the fluid is heated using a laser radiation intensity with a sinusoidal time dependence. A sinus-like pattern arises because different moving fluid portions are successively heated to a varying degree with the sinusoidal time dependence. The amplitude of the sinus-like pattern decays with distance from the focus region, due to heat diffusion effects.

Sensors 12a-d are sound speed sensors and preferably ultra-sonic sensors, which are known per se, and are arranged to generate sound and receive back reflected sound. Although an example of a reflective configuration will be described wherein sound is applied to the fluid and received back from the fluid at substantially the same location, it should be appreciated that alternatively a transmissive configuration may be used or a reflective configuration with transmitter and receiver located at different position.

Sound generated by sensors 12a-d travels through the fluid the flows through conduit 10 and is reflected back, e.g. by the wall of the conduit, and received by sensors 12a-d. Sensors 12a-d detect the reflection. From the reflection an indication of the speed of sound in the fluid is determined, for example from a delay between transmission and reception of pulses of sound. The speed of sound in fluids depends on temperature. Changes in the speed of sound detected by each sensor 12a-d are indicative of passage of the heated portions adjacent the sensor 12a-d.

In an embodiment the delay between transmission and reception is measured of pulses produced after N multiple reflections of these pulses from the walls (where N=3 or for example), i.e. pulses that have travelled a plurality of times back and forth through the interior of conduit 10. This increases sensitivity. Sensors 12a-d may be integrated in the walls of conduit 10, but alternatively sensors 12a-d attached to the outside of the walls may be used. In a further embodiment, the thickness of the walls is chosen so that the time of travel of the pulses through the thickness of the wall is larger than the time of travel through the fluid in the interior of conduit 10. This makes in easy to distinguish pulses that have travelled through the fluid. Preferably the thickness of the wall is so large that the time of travel through the wall is larger than the time of travel N time back and fourth through the fluid in the interior of conduit 10, N being 3 or 4 for example. This simplifies detection of pulses the have travelled in this way.

Figure 3:
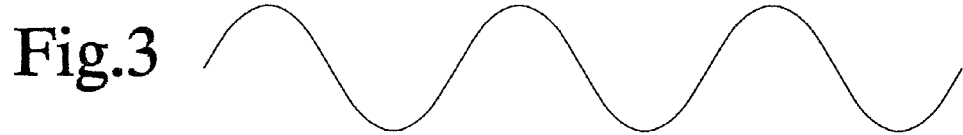
FIGS. 3 and 4 show sound speed as a function of time

FIG. 3 shows a theoretical measured sound speed as a function of time at two of the sensors 12c-d downstream from the focus region, for a sinusoidal time dependence laser irradiation intensity. As can be observed the phase of the changes in sound speed at the two sensors 12c-d is different. This is due to the time needed by a fluid portion to flow from a position adjacent the first sensor 12c to a position adjacent the second sensor 12d. The amplitude of the changes in sound speed also changes, due to heat diffusion effects.

Figure 4:

FIG. 4 also shows theoretical measured sound speed as a function of time at the same two sensors 12c-d, but for a sinusoidal time dependence laser irradiation intensity that has a higher temporal frequency. As can be observed, the frequency of sound speed changes is correspondingly higher. The amplitude of the changes in sound speed is smaller due to a relatively increased effect of heat diffusion.

Figure 5:
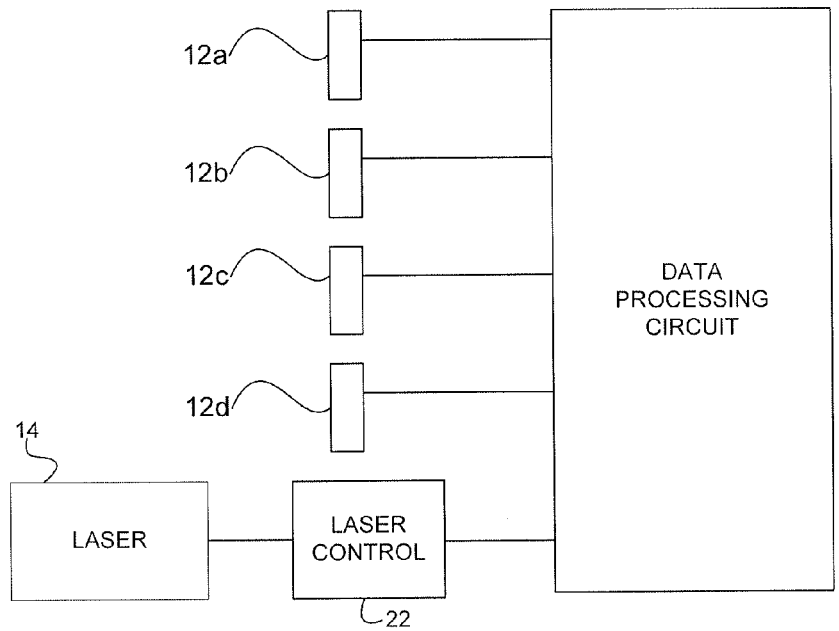
FIG. 5 shows a measurement circuit

FIG. 5 shows a measurement circuit. The circuit contains sensors 12a-d, a laser control circuit 22 and a data processing circuit 20 coupled to sensors 12a-d and laser control circuit 20. Data processing circuit 20 may a suitably programmed circuit, with I/O interface connections coupled to sensors 12a-d and laser control circuit 22. As used herein "circuit" includes both circuit structure per se and circuit structure combined with a program that programs the circuit structure to perform the required function. Data processing circuit 20 is configured to cause laser control circuit 22 to make laser assembly 14 generate laser radiation with a time dependent intensity, e.g. a sinusoidally time dependent intensity.

Furthermore data processing circuit 20 is configured to read results of sound speed measurements from sensors 12a-d and to process these results. In an embodiment, processing of the results comprises determining a phase difference between time variation of changes in sound speed indicated by the result, for the two sensors 12c-d downstream of the focus region. From the phase difference data processing circuit 20 computes the flow speed by dividing multiplying the (predetermined) distance between the two sensors 12c-d by the phase difference (this assumes that the phase difference is expressed as time difference between point of equal phase in the sound speed results from the sensors 12c-d; alternatively, when a fraction of the period of sinusoidal variation is used to express phase, data processing circuit divides a product of the distance and the frequency of the sinusoidal variation by the phase difference).

In a first embodiment, laser radiation with a sinusoidal time dependence of a predetermined fixed frequency is used. The fixed frequency defines a range of flow speeds that can be accurately measured. This range is limited for example due to the effects of heat diffusion. When heat transport due to heat diffusion becomes significant compared to heat transport due to fluid flow the accuracy of the simple relation between phase difference and flow speed is compromised. The range can be shifted to lower flow speeds by selecting a lower frequency of the sinusoidal variation of the intensity of laser irradiation. The maximum usable frequency is proportional to the square of volume flow of the fluid (and also proportional to fluid density and heat capacity and inversely proportional to thermal conductivity and the fourth power of conduit diameter). The definition of the range for a frequency can be realized for example by specifying a desired minimal accuracy and simulating operation to determine a range of flow speeds that can be measured with at least that accuracy with the frequency. Alternatively, an analytic analysis or calibration measurements may be used to determine the range.

In a second embodiment data processing circuit 20 is configured to adapt this frequency in response to the measurements. This is advantageous when the actual range of possible flow speeds is so large that it extends beyond any range of accurately measurable flow speeds defined by a single frequency.

Figure 6:
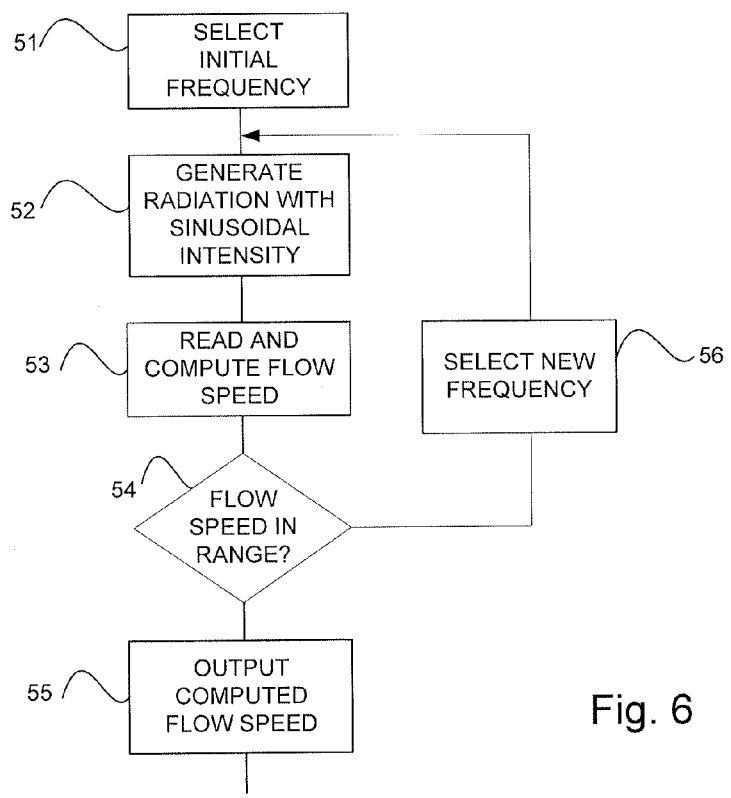
FIG. 6 shows a flow-chart of flow speed measurement

FIG. 6 shows a flow-chart of operations performed by data processing circuit 20. In a first step 51 data processing circuit 20 selects an initial frequency. In a second step 52 data processing circuit 20 causes laser assembly to generate radiation with a sinusoidally time dependent intensity. In a third step 53 data processing circuit 20 reads results from sensors 12c,d and computes a flow speed from the results if possible. In a fourth step 54 data processing circuit 20 tests whether the flow speed, if any, is in a range defined by the selected frequency (typically a range wherein the selected frequency allows for measurements of at least a predetermined accuracy). If the flow speed is in said range data processing circuit 20 executes a fifth step 55, outputting the computed flow speed. If not, data processing circuit 20 executes a sixth step 56, selecting a new frequency so that its associated range is expected to cover the flow speed (e.g. on the basis of a provisional estimate from third step 53, using a pre-programmed quadratic dependence of acceptable frequency on flow speed, or by lowering the frequency until an acceptable frequency has been found) and returns to second step 52.

In an embodiment data processing circuit 20 is configured to execute tentative flow speed measurements for a plurality of different frequencies and to compare the results of the tentative flow speed measurements for different frequencies (by "tentative" it is meant that at least part of the measurement is performed, but that it may not be a faithful measurement of sound speed because a wrong heating frequency is used). In this embodiment data processing circuit 20 selects a frequency for which the tentative measurement result does not differ from the tentative measurement result for a nearest other frequency, or does not differ by more than a predetermined error margin (e.g. 1%, 5% or 10%) from this the tentative measurement result. Alternatively an average of results for a plurality of frequencies may be computed for which the tentative measurements do not differ by more than the predetermined error margin.

In an embodiment data processing circuit 20 may be configured to execute tentative flow speed measurements for a plurality of different frequencies successively, or by causing heating with a heating intensity as a function of time that is a combination of heating patterns of different frequency. In the latter case data processing circuit 20 may extract the responses to different frequencies from the response to the combination of heating patterns for example by Fourier analysis.

The measured flow speed may be used to control selection of the initial frequency for subsequent messages. In an embodiment data processing circuit 20 increases the selected frequency if the measured flow speed has a value in a range associated with the increased frequency (e.g. where the increased frequency provides for sufficiently accurate flow speed measurement). Setting a higher frequency has the advantage of reducing the time needed for measurements.

Although embodiments have been described wherein a sinusoidal time dependence of the laser irradiation intensity is used, it should be appreciated that other forms of time dependence may be used. In one example a frequency band-limited time dependence is applied and the flow speed is determined from the delays with which this time dependence is observed at the sensors 12c,d. In a further embodiment time dependence may be changed to shift the band according to flow speed. In another embodiment band limitation is applied to signals from sensors 12c,d after measurement, dependent on the expected flow speed (e.g. by filtering using a low pass filter). In these embodiments the frequency of the flow-chart may be used to set the bandwidth.

One of the sensors 12b may be used to monitor heating. In an embodiment data processing circuit 20 controls the intensity of irradiation in a feedback loop using measurements obtained from this sensor 12b. The amplitude of intensity variation or the intensity itself may be controlled in feed back for example so that at least a predetermined sound speed variation is realized. Another one of the sensors 12a is used to detect backflow from changes in sound speed. When back flow is detected data processing circuit 20 may control a valve to adjust or interrupt the back flow for example.

In an embodiment a source of absorbing material is coupled to conduit 10, configured to release material that absorbs radiation from laser assembly 14. Thus, it is possible to measure flow speed also in fluids that do not themselves absorb radiation.

In another embodiment laser assembly 14 is omitted and a source of material that affects sound speed is added instead. In operation the source adds material into the flowing fluid at a time dependent rate, to provide a label instead of heating. Thus, flow speed can be measured. However, compared to this use of laser irradiation has the advantage that no contact between the focus region and the wall of the conduit is needed. Thus, effects of the conduit are eliminated.

As another alternative to a laser assembly other contactless heating techniques may be used, such as irradiation with a source of sound waves, an RF electromagnetic irradiation source, a microwave source a radioactive source etc. Also a resistive heating wire may be used, or if the fluid is electrically conductive, inductive heating may be used. In each case, the heat is preferably applied concentrated in a region away from the walls of conduit 10. Although a focussed source is preferred it should be appreciated that other sources may be used, e.g. a source that provides maximum intensity irradiation over a region with predetermined size and shape away from the walls.

The invention claimed is:

1. A fluid flow meter, comprising:
a conduit;
a heater configured to heat fluid at a heating location in the conduit;
sound speed sensors configured to measure a speed of sound in fluid flowing in the conduit at a plurality of sensing locations downstream from said heating location;
a data processing circuit configured to determine flow speed of the fluid flowing in the conduit from a delay with which a time dependence of heating strength by the heater is detected in sound speeds in fluid flowing in the conduit measured by the sensors; and
wherein the data processing circuit is configured to dynamically select a frequency or frequency range of the measured time dependence of heating that is used for determining the flow speed of the fluid flowing in the conduit, the selection of the frequency or frequency range being dependent on the determined flow speed and/or fluid properties measured in fluid flowing in the conduit at a time the sensors measure the speed of sound in fluid flowing in the conduit.

2. The fluid flow meter according to claim 1, wherein the data processing circuit is configured to obtain a plurality of tentative measurements of flow speed of fluid flowing in the conduit using a plurality of frequencies, or frequency ranges, of heating strength variation, and to select the frequency or frequency range for use in determining the flow speed of fluid flowing in the conduit dependent on whether a tentative measurement for the selected frequency or frequency range does not differ more than by a predetermined difference from a tentative measurement for a nearest other one of the plurality of frequencies, or frequency ranges of heating.

3. The fluid flow meter according to claim 1, wherein the data processing circuit is configured to adapt the frequency or frequency range of the measured time dependence of heating that is used for determining the flow speed of fluid flowing in the conduit by adapting a frequency or frequency range of the time dependence of the heating strength with which the fluid is heated dependent on the determined flow speed and/or fluid properties measured in fluid flowing in the conduit at a time the sensors measure the speed of sound in the fluid flowing in the conduit.

4. The fluid flow meter according to claim 3, wherein the data processing circuit is configured to repeat the determination of the flow speed, using successively adapted frequencies or frequency ranges of the time dependence of the heating strength to adapt the frequency or frequency range of the measured time dependence of heating that is used for determining the flow speed of fluid flowing in the conduit by adapting a frequency or frequency range of the time dependence of the heating strength with which the fluid is heated dependent on the determined flow speed and/or fluid properties measured in fluid flowing in the conduit at a time the sensors measure the speed of sound in the fluid flowing in the conduit.

5. The fluid flow meter according to claim 4, wherein the data processing circuit is configured to:
repeat the determination of the flow speed of the fluid flowing in the conduit, using successively adapted frequencies or frequency ranges of the time dependence of the heating strength,
determine whether the adapted frequency or frequency range meets a predetermined condition dependent on the flow speed of the fluid flowing in the conduit determined from the measurements of the speed of sound obtained with the adapted frequency or frequency range; and continue said repeating the determination of the flow speed until said predetermined condition is met.

6. The fluid flow meter according to claim 4, wherein the data processing circuit is configured to:

compute a further frequency or frequency range using a predetermined relation between flow speed and frequency applied to the flow speed determined using an initial frequency or frequency range of the time dependence of the heating strength, and to repeat the determination of the flow speed of the fluid flowing in the conduit, using the further frequency or frequency range.

7. The fluid flow meter according to claim 1, wherein the heater comprises a radiation source configured to heat the fluid in the conduit by absorption of radiation.

8. The fluid flow meter according to claim 1, wherein the heater is configured to generate a maximum intensity of irradiation in a region in the conduit that is separate from a wall of the conduit.

9. The fluid flow meter according to claim 1, wherein the heater comprises a laser.

10. A method of performing a measurement of fluid flow, the method comprising:

applying a fluid flow to a conduit;

heating the fluid at a heating location in the conduit with a time-dependent heating strength;

measuring a speed of sound in fluid flowing in the conduit at a plurality of sensing locations downstream from said heating location;

determining flow speed of the fluid from a delay with which the time dependence of the heating strength of heating is detected in the speed of sound in fluid flowing in the conduit measured at said sensing locations; and selecting a frequency or frequency range of the measured time dependence of the heating strength dynamically dependent on the flow speed and/or fluid properties at a time of performing the measurements of the speed of sound.

11. A non-transitory computer readable medium comprising computer-executable instructions for performing a measurement of fluid flow, the computer-executable instructions, when executed by a programmable computer, cause the computer to:

control a heater to apply heat, to fluid flowing at a heating location in a conduit, with a time dependent heating strength;

obtain measurement data indicative of a speed of sound in fluid flowing in the conduit at a plurality of sensing locations downstream from said heating location; and compute flow speed of the fluid from a delay with which a time dependence of heating strength by the heater is detected from indications of the speed of sound at the sensing locations; and adapt a frequency or frequency range of a measured time dependence of the heating strength dependent on the computed flow speed and/or fluid properties performing the measurements of data indicative of the speed of sound in the fluid flowing in the conduit.

* * * * *